Patented Sept. 5, 1922.

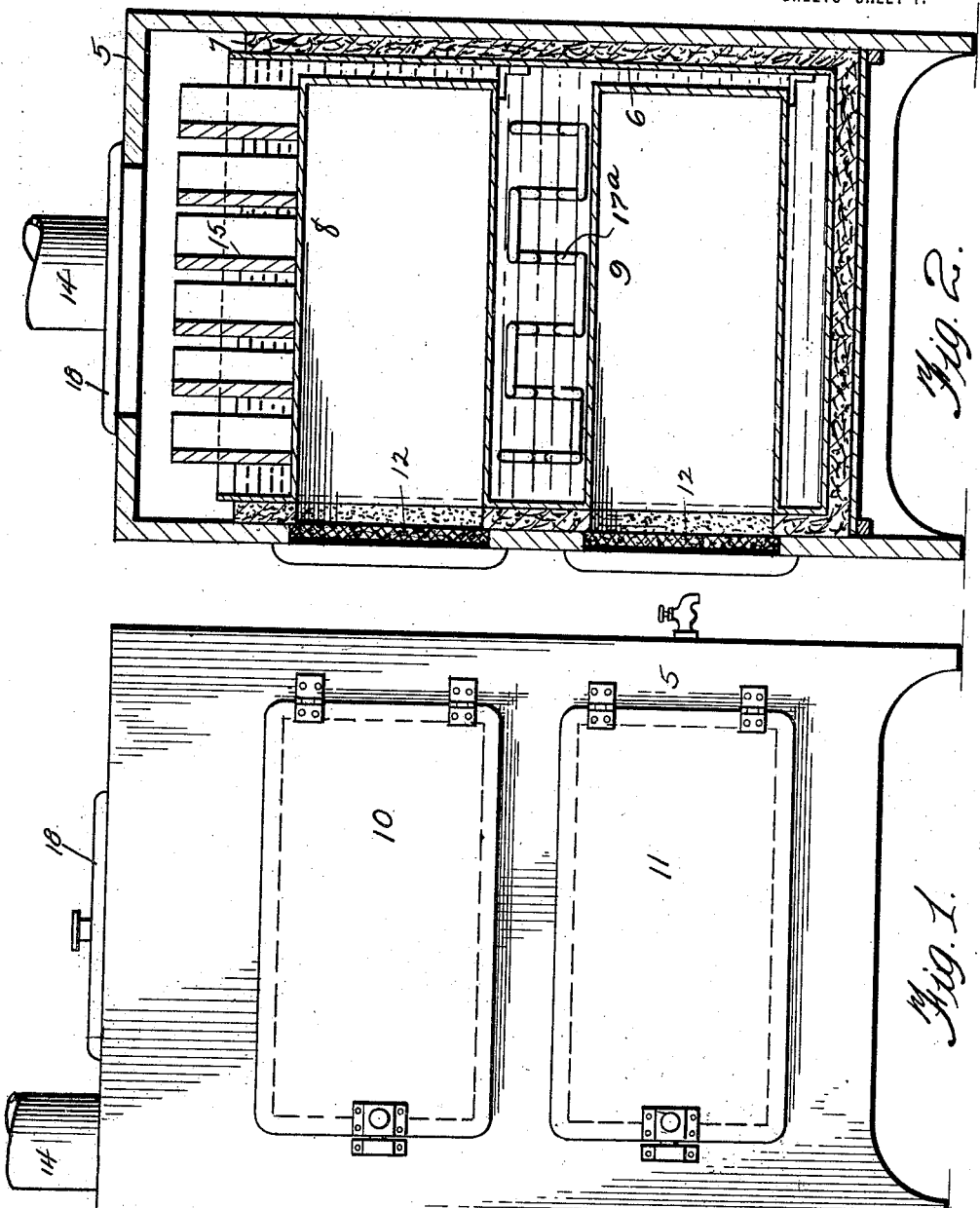

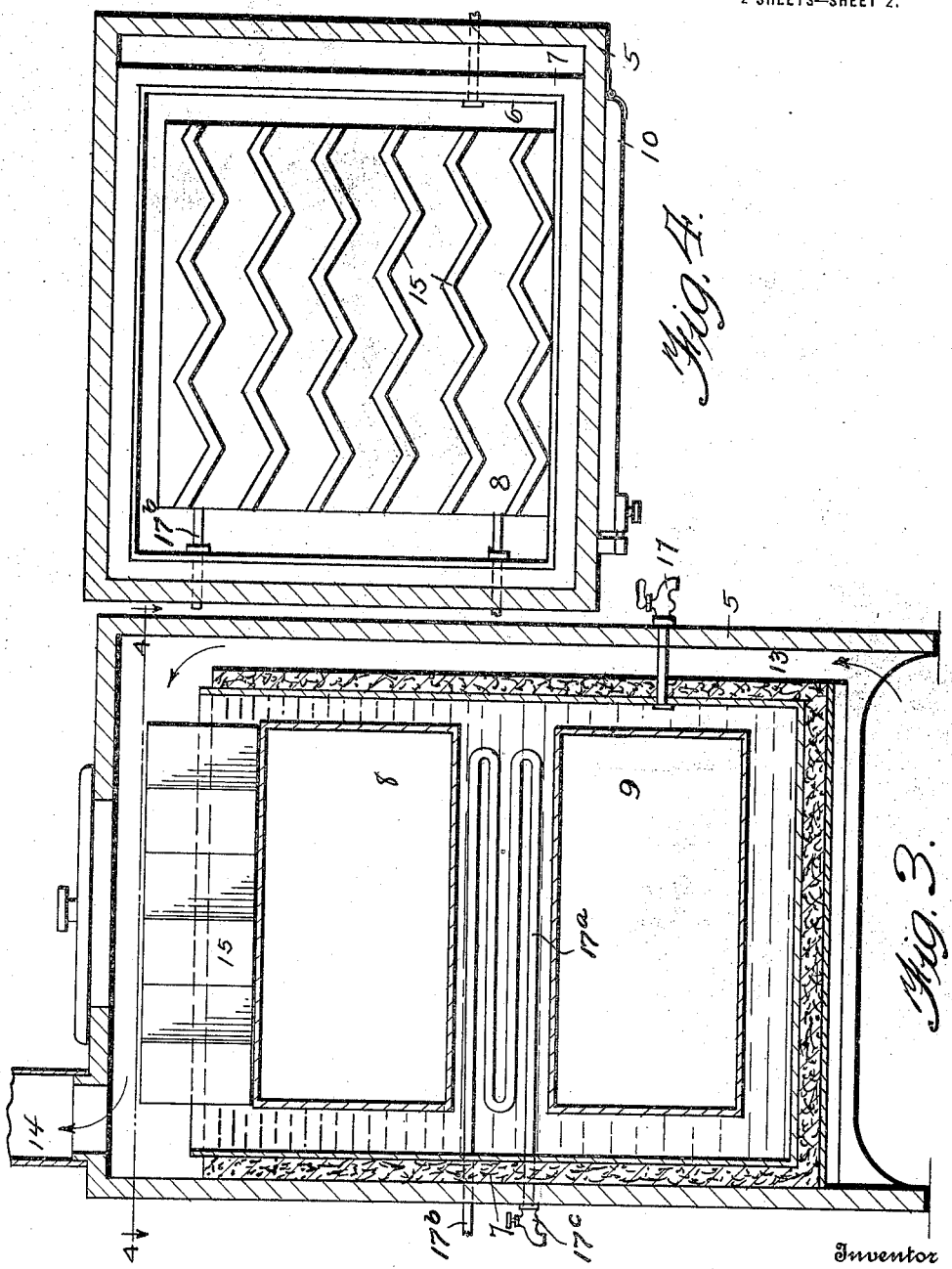

1,427,981

UNITED STATES PATENT OFFICE.

CHARLES C. SWARTWOOD, OF CENTRALIA, WASHINGTON.

EVAPORATIVE ICELESS REFRIGERATOR.

Application filed July 28, 1921. Serial No. 488,202.

*To all whom it may concern:*

Be it known that I, CHARLES C. SWARTWOOD, a citizen of the United States, residing at Centralia, in the county of Lewis and State of Washington, have invented certain new and useful Improvements in Evaporative Iceless Refrigerators, of which the following is a specification, reference being had therein to the accompanying drawings.

This invention relates to iceless refrigerators and it has for its object to provide an improved refrigerator of the evaporative type which will be simple and economical in construction and will be highly efficient in maintaining the food receiving compartments thereof at a low temperature.

It is a further object of the invention to provide a refrigerator of the character above outlined adapted to serve as a water cooler or adapted to serve as a combined water cooler and food refrigerator.

Further objects and advantages of the invention will be set forth in the detailed description following.

In the accompanying drawings:

Fig. 1 is a front elevation of a refrigerator constructed in accordance with the invention;

Fig. 2 is a transverse vertical view therethrough;

Fig. 3 is a longitudinal sectional view therethrough; and

Fig. 4 is a horizontal sectional view upon line 4—4 of Fig. 3.

Like numerals designate corresponding parts throughout the several figures of the drawings.

In carrying out the invention, I provide a casing 5 within which a water receiving tank 6 is mounted. The front and rear walls, the end walls and the bottom of the tank 6 are covered by insulating material 7 and protected from contact with the outside air. Upper and lower food receiving compartments 8 and 9 project from front to rear through the water tank 6 and consequently these compartments are surrounded by the chilled water in said tank. Doors 10 and 11 provide closures for the open fronts of the compartments 8 and 9 and these doors are insulated against the passage of heat by insulating material 12.

At one side of the structure the tank 6 and its covering insulating material abuts directly against the adjacent wall of the casing 5, but at the opposite side the tank and its insulating material are spaced from adjacent wall of the casing 5 to leave an air channel 13, the lower end of which is open to the atmosphere. A flue 14 adapted to be connected to a chimney, or otherwise, as desired, leads from the top of the casing 5 at that side of the structure remote from the channel 13. Thus the induced flow of air is upwardly through the channel 13 then laterally across the top of the tank 6 and upwardly through the flue 14. In its travel laterally across the top of the tank 6 the air comes in contact with a plurality of capillaceous cooling elements made of wicks or like capillaceous material part of which projects into the path of the air and part of which depends into the water contained within the tank 6. I wish it to be understood that the invention is very broad with respect to the nature of the material which may be used in the relation indicated. For the sake of brevity I will hereinafter refer to wicks 15. But it is to be understood that by this term, I intend to include any capillaceous material adapted to conduct water by capillarity from the tank 6 into the path of the current of air across the top of said tank.

The advantageous cooling action upon the water contained within the tank 6 by the evaporation of water from the wicks 15 will readily be understood, since the broad principle involved has been recognized for many years. However, it is to be noted that the construction that I have devised for applying this principle involves novel features of very great benefit in the production of an efficient apparatus.

Among these may be mentioned the facts that my improved evaporative refrigerator is very similar in appearance to refrigerators already in use and is adapted to fit within the spaces ordinarily provided for the reception of such refrigerators. The complete separation of the tank 6 from the wall of the casing 5 by the insulating material 7 prevents any tendency of the refrigerator to sweat. The structure is compact, economical of manufacture and provides a large food receiving capacity in proportion to the size of the complete refrigerator. The arrangement of wicks is such as to cause the air to come into contact with a very considerable area of water bearing surface with a corresponding increase in the cooling capacity of the refrigerator.

A further and very important feature is the fact that the food compartments are entirely surrounded by the cold water in the tank 6.

While I have shown the wicks as lying in parallelism and as being of zig-zag formation, it is to be understood that the shape of these wicks may be varied without departure from the invention because many changes in shape may be made without impairing the efficient operation of the device.

The refrigerator shown and described not only serves to efficiently chill the food compartment but the chilling of the water in the tank 6 renders an ample supply of cold water available for drinking purposes and to permit of the ready withdrawal of this water for that purpose, I have indicated a faucet 17. Instead of using the water directly from the tank, for drinking purposes, the invention contemplates the placing of a coil $17^a$ in said tank and conducting water to said coil through a supply pipe $17^b$ and from said coil through a faucet $17^c$. Thus the water in the tank is used to cool the water in the coil but does not come in direct contact therewith. A cover 18 may be provided in the top of the casing 5, if desired, to permit access to be had to the wicks 15 and to provide for replenishing the water in tank 6.

It is to be understood that the invention is not limited to the precise construction set forth because changes may be made therein without departure from the spirit of the invention. Other arrangements of entrance and exit of the air may be resorted to so long as the air is caused to travel past the capillaceous material. Furthermore, the flow of air may be induced in other ways than by the attachment of a flue to a chimney, the use of fans, etc., being well known in the art.

While I have shown the invention as embodied in a cabinet, it is to be understood that it may be embodied in built-in structures in homes, hotels, apartments, boats, trains, refrigerator cars and the like. The structure shown and described is susceptible of use as a cooling medium for stills, condensors or any other compartment to be chilled, the compartments illustrated not being limited to use for the reception of food.

Having described my invention what I claim is:

1. An evaporative refrigerator of the character comprising a casing, a water tank therein spaced from the wall of the casing along one side thereof to provide a vertical air channel open at the bottom to the atmosphere, a natural draft outlet flue at the other side of the casing, the top of the water tank being spaced from the top of the casing to provide a passage of air which travels upwardly from beneath the casing through the vertical channel entirely across the top of the tank continuously in one direction and out of said flue and capillaceous elements lying partly in the water in the tank and partly above said tank and above the water level and projecting into the path of the current of air.

2. A structure as recited in claim 1 wherein said capillaceous elements are of zig-zag formation.

3. An evaporative refrigerator of the character described comprising a casing, a water tank therein spaced from the wall of the casing along one side thereof and contacting with said casing at the opposite side thereof to provide a vertical air channel at one side of the water tank only, an outlet flue at the other side of the casing and at the top thereof, the top of the water tank being spaced from the top of the casing to provide a passage for air, said air traveling upward through the vertical channel and across the top of the tank and out of said flue and a plurality of elongated capillaceous elements lying partly in the water in the tank and partly above said tank and above the water level and projecting into the path of the current of air, said capillaceous element lying in substantial parallelism with each other and being of a length to extend substantially entirely across the top of the tank.

In testimony whereof I hereunto affix my signature.

CHARLES C. SWARTWOOD.